(12) United States Patent
Visscher et al.

(10) Patent No.: US 11,685,436 B2
(45) Date of Patent: *Jun. 27, 2023

(54) VEHICLE DRIVE TRANSMISSION AND ELECTRICALLY ASSISTED STEERING SYSTEM

(71) Applicant: Ontario Drive & Gear Limited, New Hamburg (CA)

(72) Inventors: Peter Derek Visscher, Lakeside (CA); Jeremy Bauman, Plattsville (CA); Robert Reiter, Baden (CA)

(73) Assignee: Ontario Drive & Gear Limited, New Hamburg (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,355

(22) Filed: Jun. 13, 2022

(65) Prior Publication Data

US 2022/0306195 A1  Sep. 29, 2022

Related U.S. Application Data

(63) Continuation of application No. 15/842,301, filed on Dec. 14, 2017, now Pat. No. 11,358,636.

(Continued)

(51) Int. Cl.
*B62D 5/04* (2006.01)
*B62D 11/10* (2006.01)
(Continued)

(52) U.S. Cl.
CPC .......... *B62D 11/183* (2013.01); *B60F 3/0015* (2013.01); *B60L 50/16* (2019.02); *B62D 5/0463* (2013.01); *B62D 5/065* (2013.01); *B62D 11/10* (2013.01); *B60K 7/0007* (2013.01); *B60K 17/08* (2013.01); *B60K 17/165* (2013.01); *B60K 2001/001* (2013.01); *B60Y 2200/25* (2013.01); *Y02T 10/70* (2013.01); *Y02T 10/7072* (2013.01)

(58) Field of Classification Search
CPC ......... B62D 11/10; B62D 11/12; B62D 11/14; B62D 11/16; B62D 11/18; B62D 11/183; B60K 17/16; B60K 17/165; F16H 3/72; F16H 3/724; B60L 50/16
USPC .................... 180/6.44; 475/5, 6, 205; 477/1
See application file for complete search history.

(56) References Cited

U.S. PATENT DOCUMENTS

| | | |
|---|---|---|
| 1,991,094 A | 2/1935 | Higley |
| 2,542,157 A | 2/1951 | Odom |

(Continued)

*Primary Examiner* — Anne Marie M Boehler
(74) *Attorney, Agent, or Firm* — Dicke, Billig & Czaja, PLLC (57) ABSTRACT

A transmission for a vehicle, particularly a skid-steered vehicle, that employs motive power from a prime mover delivered through an input shaft to drive left and right drive shafts at a nominal speed and input power from an electric motor to vary the speed of the left and right drive shafts according to steering commands from a steering control structure. The speed of the left and right drive shafts is directly related to a speed of the input shaft and the nominal speed of the left or right drive shaft is varied upwardly or downwardly by a ratio of the speed of the steering shaft via a speed varying structure. The speed of the left and right drive shafts is simultaneously varied in opposite directions (i.e. upwardly and downwardly) relative to the nominal speed by an equal number of rotations.

18 Claims, 8 Drawing Sheets

Related U.S. Application Data (60) Provisional application No. 62/437,618, filed on Dec. 21, 2016.

(51) Int. Cl.

| | | |
|---|---|---|
| *B60K 17/16* | (2006.01) | |
| *B62D 11/14* | (2006.01) | |
| *F16H 3/72* | (2006.01) | |
| *B62D 11/18* | (2006.01) | |
| *B60F 3/00* | (2006.01) | |
| *B62D 5/065* | (2006.01) | |
| *B60L 50/16* | (2019.01) | |
| *B60K 7/00* | (2006.01) | |
| *B60K 17/08* | (2006.01) | |
| *B60K 1/00* | (2006.01) | |

(56) References Cited

U.S. PATENT DOCUMENTS

| | | | |
|---|---|---|---|
| 2,546,869 A | 3/1951 | Przybylski | |
| 3,371,734 A | 3/1968 | Zaunberger et al. | |
| 3,776,325 A | 12/1973 | Jespersen | |
| 3,895,845 A | 7/1975 | Hale | |
| 4,428,445 A | 1/1984 | Zaunberger | |
| 4,600,068 A | 7/1986 | Lenhard-Backhaus | |
| 4,671,774 A | 6/1987 | Owsen | |
| 4,718,508 A | 1/1988 | Tervola | |
| 4,776,235 A | 10/1988 | Gleasman | |
| 4,813,506 A | 3/1989 | Smith | |
| 4,895,052 A | 1/1990 | Gleasman | |
| 4,998,591 A | 3/1991 | Zaunberger | |
| 5,275,248 A | 1/1994 | Finch | |
| 5,853,346 A | 12/1998 | Gaffney | |
| 6,050,914 A | 4/2000 | Shimaya et al. | |
| 6,098,737 A | 8/2000 | Acki | |
| 6,454,031 B2 | 9/2002 | Symkowiak | |
| 6,478,706 B1 * | 11/2002 | Crabb | B62D 11/18 475/28 |
| 6,491,118 B1 | 12/2002 | Hou | |
| 6,656,074 B2 | 12/2003 | Andriani | |
| 6,782,960 B2 | 8/2004 | Kanzler | |
| 6,953,408 B2 | 10/2005 | Thompson | |
| 7,040,426 B1 | 5/2006 | Berg | |
| 7,131,507 B2 | 11/2006 | Wenger et al. | |
| 7,497,796 B2 | 3/2009 | Ordo | |
| 7,500,933 B2 | 3/2009 | Baasch | |
| 7,478,817 B1 | 12/2009 | Carrier | |
| 7,673,711 B1 | 3/2010 | Berg | |
| 7,686,726 B2 | 3/2010 | Thompson | |
| 7,757,797 B2 * | 7/2010 | Dobereiner | B62D 55/06 180/65.6 |
| 8,002,596 B2 | 8/2011 | Wernicke et al. | |
| 8,206,190 B2 | 6/2012 | Lee | |
| 8,439,152 B2 | 5/2013 | Visscher | |
| 8,627,907 B2 | 1/2014 | Karrie et al. | |
| 8,808,042 B1 | 8/2014 | Hewitt | |
| 8,813,879 B2 | 8/2014 | Walter | |
| 8,844,665 B2 | 9/2014 | Wenger et al. | |
| 9,219,393 B2 | 12/2015 | Karlsson | |
| 11,358,636 B2 | 6/2022 | Visscher | |
| 2002/0022415 A1 | 2/2002 | Choi | |
| 2002/0193927 A1 | 12/2002 | Nakagawa | |
| 2004/0116228 A1 | 6/2004 | Thompson | |
| 2004/0220011 A1 | 11/2004 | Gumpoltsberger | |
| 2005/0187067 A1 | 8/2005 | Debereiner | |
| 2007/0068710 A1 | 3/2007 | Witzenberger | |
| 2007/0198158 A1 | 8/2007 | Ishibashi | |
| 2009/0039610 A1 | 2/2009 | Karpik | |
| 2014/0060949 A1 | 3/2014 | Anderson | |
| 2014/0288763 A1 | 9/2014 | Bennett et al. | |
| 2015/0004854 A1 | 1/2015 | Hewitt | |
| 2015/0105965 A1 | 4/2015 | Blackwell | |

\* cited by examiner

VEHICLE DRIVE TRANSMISSION AND ELECTRICALLY ASSISTED STEERING SYSTEM

CROSS-REFERENCE TO RELATED APPLICATION

This Utility patent application is a continuation application of U.S. Ser. No. 15/842,301, filed Dec. 14, 2017, which claims the benefit of the filing date of U.S. Provisional Patent Application Ser. No. 62/437,618, filed Dec. 21, 2016, both of which are incorporated herein by reference.

TECHNICAL FIELD

This disclosure relates to transmission and steering systems for vehicles, particularly skid-steered vehicles such as all-terrain vehicles (ATV's) propelled by wheels or an endless loop track on ground or water. More particularly, the invention relates to a vehicle transmission and steering system that is drivable by both a prime mover (e.g. combustion engine or electric motor) and an electric steering motor simultaneously, for example to facilitate skid-steering of the vehicle.

BACKGROUND

On skid-steered vehicles, such as ATV's (including amphibious ATV's), to accomplish a turn to the left, for example, the drive structure (wheels or tracks) on the left side is braked while power is transmitted to the wheels on the right. This leads to a waste of power through braking, slowing the vehicle through the turn and making the turn abrupt, imprecise and inefficient in terms of energy consumption.

Attempts have been made to provide improved transmissions for all-terrain skid-steered vehicles. For example, U.S. Pat. No. 8,439,152, filed Aug. 6, 2010, discloses a transmission with improved steering sensitivity that makes use of a triple-differential arrangement. However, further improvements are required.

SUMMARY

In one aspect, there is provided a transmission for a vehicle comprising an input shaft to be driven by a prime mover, a steer shaft to be driven by a steering motor and speed varying structure to vary a rotational speed of a left and right drive shaft of the transmission according to the rotational speed of the steering shaft.

The left and right drive shafts may each have a nominal speed that is directly related to a speed of the input shaft. The speed of the left or right drive shaft may be varied upwardly or downwardly relative to the nominal speed by a ratio of the speed of the steer shaft via the speed varying structure. The ratio may be 0.5, 1, 1.5, 2, 2.5, 3, 3.5 or any value in the range of 0.5 to 3.5. The speeds of the left and right drive shafts may be simultaneously varied in opposite directions (i.e. upwardly and downwardly) relative to the nominal speed by an equal amount.

In another aspect, there is provided a transmission for a vehicle substantially as shown and described herein.

In yet another aspect, there is provided a steering system for a vehicle comprising the transmission substantially as shown and described herein, a steering motor and a steering control structure for providing steering commands to the steering motor.

In still another aspect, there is provided a vehicle comprising the transmission substantially as shown and described herein.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Like elements are described with like reference numerals; thus, items shown on a particular drawing may be described in connection with another drawing containing the same reference numeral.

Figure 5:
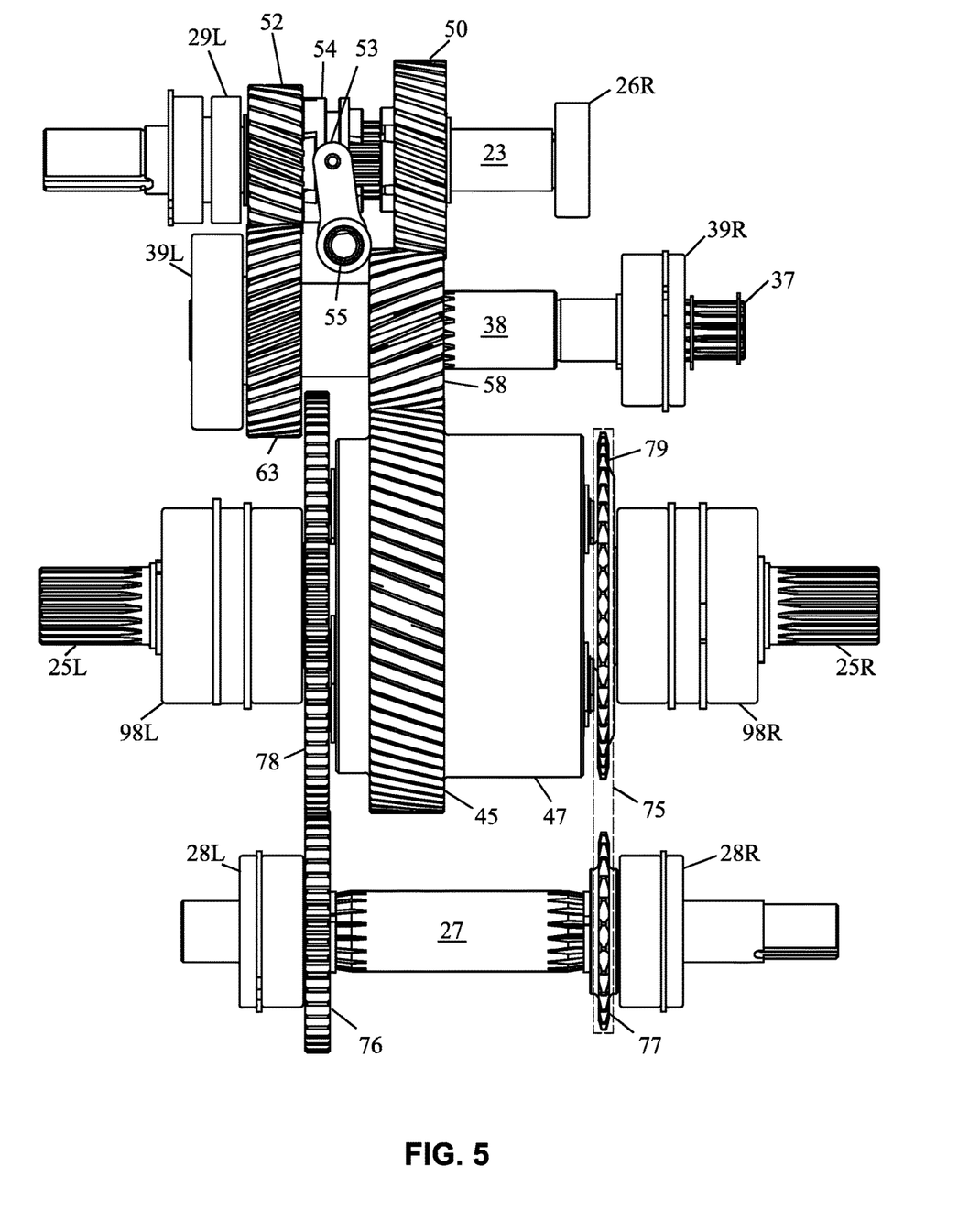
FIG. 5 shows a second schematic diagram of the embodiment of the transmission of FIG. 1 with the hi/lo selector in the LOW position.
Figure 6:
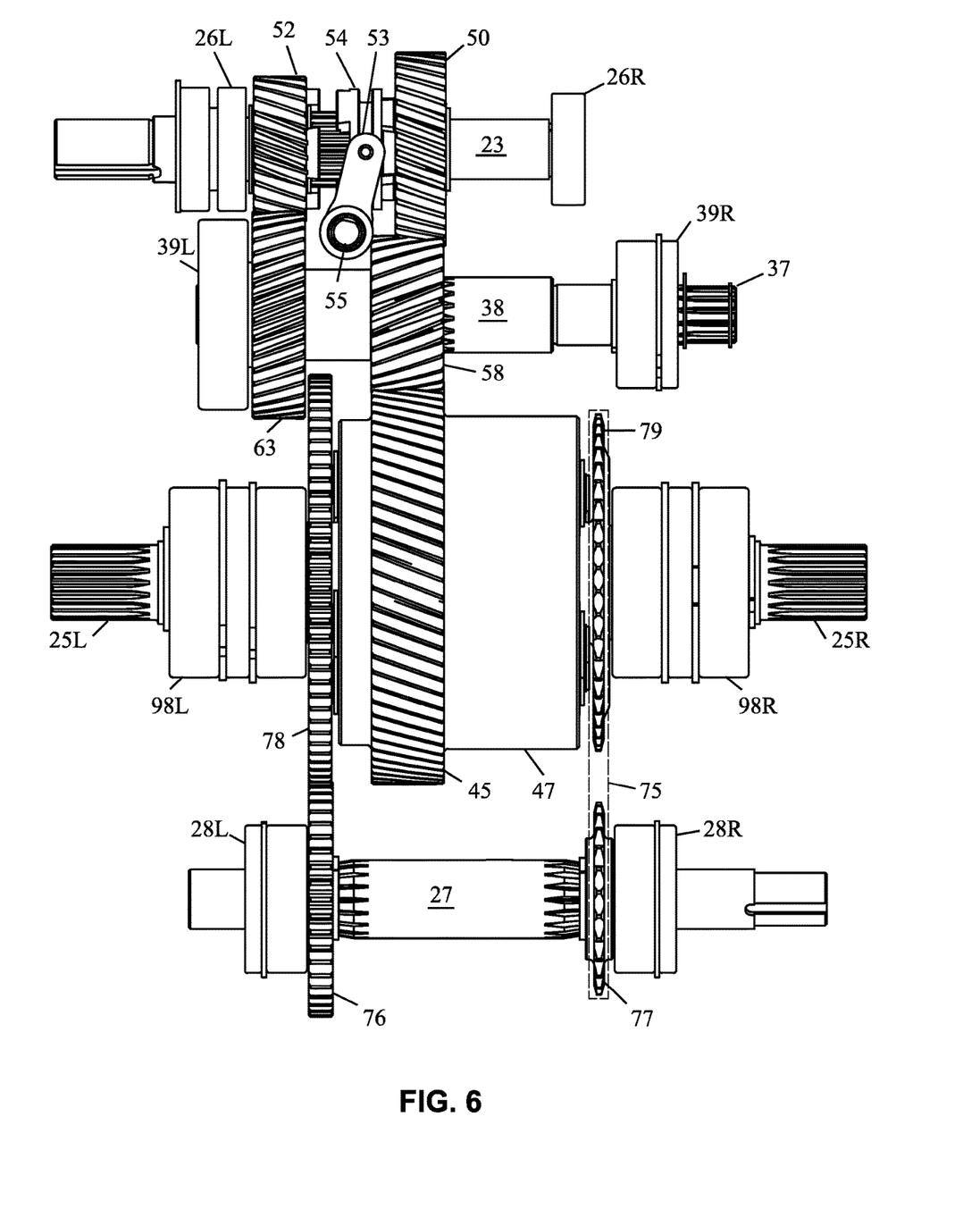
FIG. 6 shows a third schematic diagram of the embodiment of the transmission of FIG. 1 with the hi/lo selector in the HIGH position.
Figure 7:
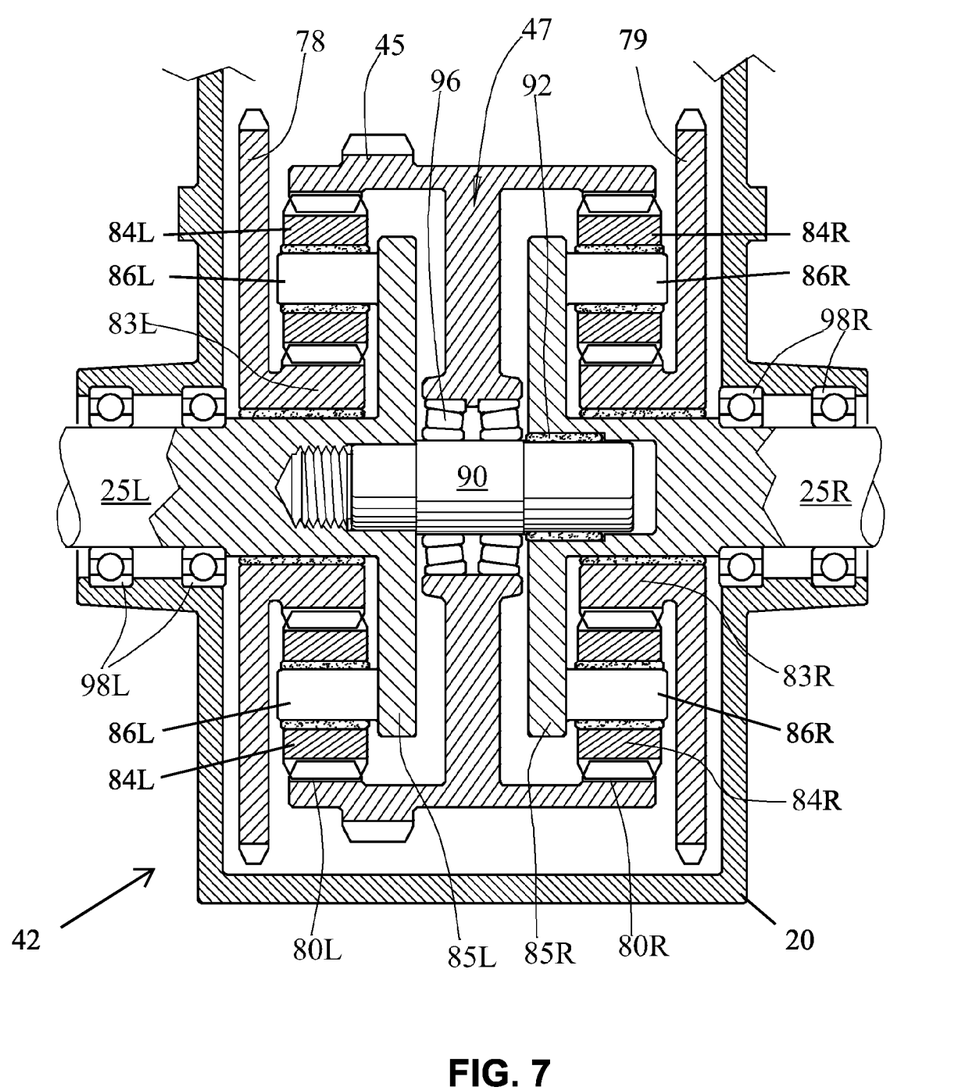
FIG. 7 shows a cross-sectional illustration of a lower portion of the embodiment of the transmission of FIGS. 1 and 3; and, FIG. 8 shows a front portion of a vehicle including a transmission according to FIGS. 1-7, which forms part of a steering system of the vehicle.
Figure 8:
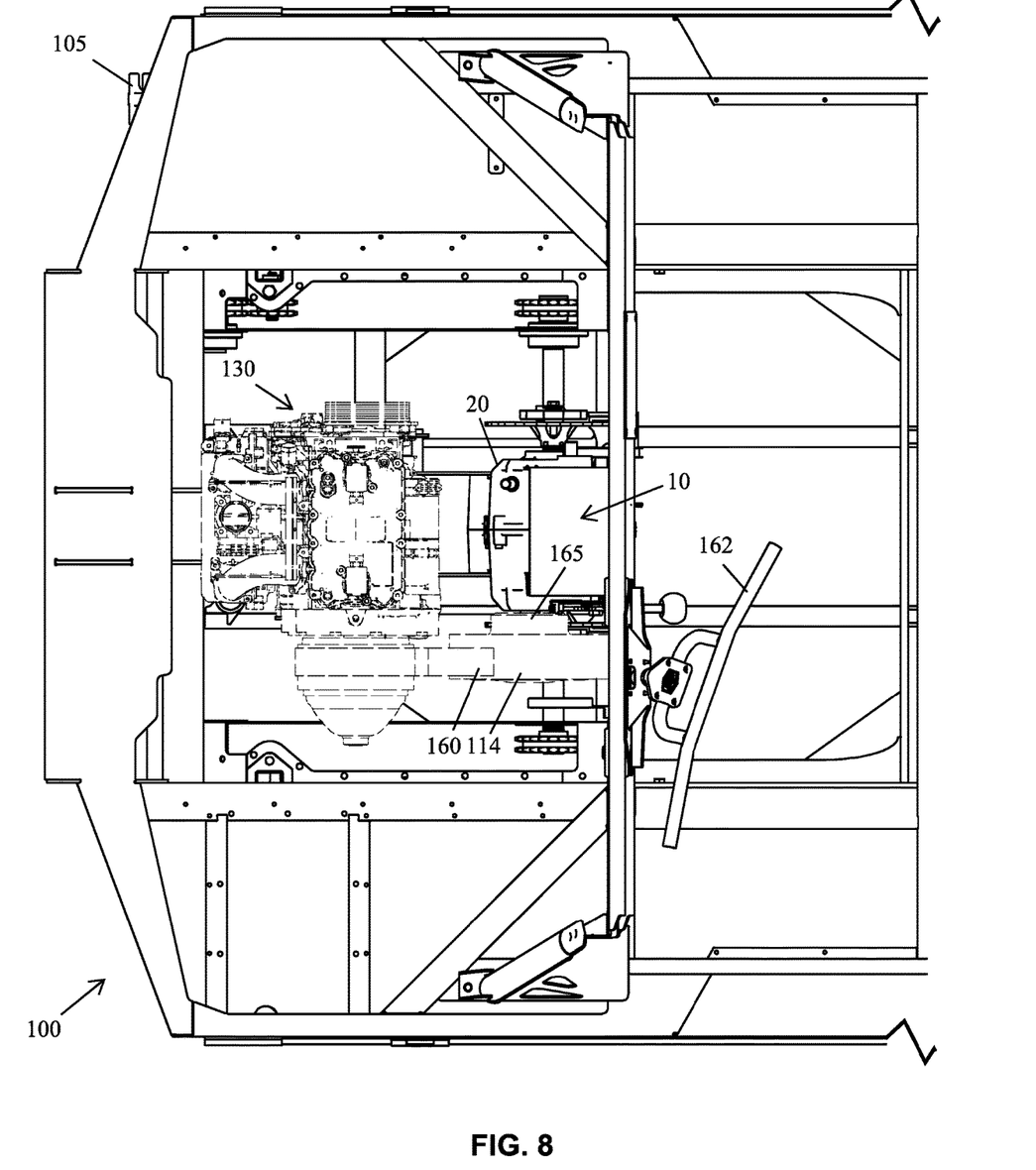

Referring generally to FIGS. 1-8 and starting specifically with FIG. 7, the transmission 10 shown in the drawings is contained in a transmission housing 20. In FIGS. 1-6, the transmission housing 20 is omitted to better show interior features of the transmission. Referring now to FIG. 8, motive drive power is provided by a prime mover 130, such as a combustion engine or electric motor, and applied to an input shaft 23 (see FIGS. 1-6). In some embodiments, the drive power from the prime mover 130 is not applied directly to the input shaft 23, but rather is transmitted through a variable-speed drive 114, for example of the mechanically geared, hydrostatic or continuously-variable transmission (CVT) type or, when the prime mover is an electric motor, of the voltage controlled, current controlled or variable-frequency (VFD) type.

Drive power passes through the transmission system from the input shaft 23 to the left and right drive-shafts 25L,25R (FIGS. 1-7) via speed varying structure in a manner to be described. The drive-shafts 25L,25R may be connected to the vehicle drive structure 105 (tracks in the embodiment of the vehicle shown in FIG. 8) directly or through respective final-ratio-drives (not shown).

Steering of the vehicle is effected by a steering system comprising the transmission 10 and steering control structure 160 that provides signals to a steering motor 165 that is connected to the transmission 10 in a manner to be further described. A steering command interface 162 (handle bars in the embodiment of the vehicle shown in FIG. 8) is used to transmit an operators steering commands to the steering control structure 160. It will be appreciated by those of skill in the art that steering command interface 162 could comprise a steering wheel or a pair of independent left/right skid-steer handles as is conventionally known for skid-steered vehicles. In addition, the vehicle need not be configured for transporting the operator, such as in an autonomous or remotely controlled vehicle. In this case, the steering command interface 162 may be remote from the vehicle and connected wireless thereto. In the case of autonomous vehicles, the steering command interface 162 may be used to program the steering control structure 160 via a wired or wireless interface and is not necessarily in continuous communication with the steering control structure 160.

Turning to FIGS. 1-7, the speed varying structure of the transmission 10 will now be further described. An engine-high-gear 50 and an engine-low-gear 52 are carried on the input shaft 23 and are mounted on gear-bearings 51 for rotation relative to the input shaft 23. Also carried on the input shaft 23 is a hi/lo selector-sleeve 54, which is splined to the input shaft, i.e. the selector-sleeve 54 is constrained to rotate with the input shaft 23, but can slide axially along the input shaft. The input shaft 23 is rotationally supported within the housing 20 by input-shaft-bearings 26L,26R.

Changing between LOW and HIGH is accomplished by manually operating the hi/lo shift-rod 55. A hi/lo shift-fork 53, mounted on and fixed to the hi/lo shift-rod 55, engages the hi/lo selector-sleeve 54, and slides the selector-sleeve 54 along the splines of the input shaft 23. In turn, this movement dogs the selector-sleeve 54 either to the engine-high-gear 50 or to the engine-low-gear 52. Thus, the driver is able to set the vehicle either in HIGH speed mode or in LOW speed mode through rotation of the hi/lo shift-rod 55. The hi/lo shift-rod 55 is supported at one end within the housing 20 by shift-support-shaft 57 and an opposite end extends outwardly from the housing to facilitate easy rotation thereof.

When the hi/lo selector-sleeve 54 is moved to the left (as illustrated in FIG. 5) through counter-clockwise rotation of the hi/lo shift-rod 55, the selector sleeve 54 engages with the engine-low-gear 52, which is thereby forced to rotate with the input shaft 23. When the hi/lo selector-sleeve 54 is moved to the right (as illustrated in FIG. 6) through clockwise rotation of the hi/lo shift-rod 55, the selector-sleeve 54 engages with the engine-high-gear 50, whereby now the engine-high-gear 50 is forced to rotate with the input shaft 23.

When the hi/lo selector-sleeve 54 is engaged with the engine-low-gear 52, the selector-sleeve 54 is clear of the engine-high-gear 50, which is therefore free to rotate relative to the input shaft 23. That is to say: when LOW mode is selected, the engine-high-gear 50 is rotationally free of the input shaft 23. Correspondingly, when HIGH mode is selected, i.e. when the hi/lo selector-sleeve 54 is engaged with (i.e. dogged to) the engine-high-gear 50, the selector-sleeve 54 is clear of the engine-low-gear 52, which is therefore free to rotate relative to the input shaft 23.

Figure 1:
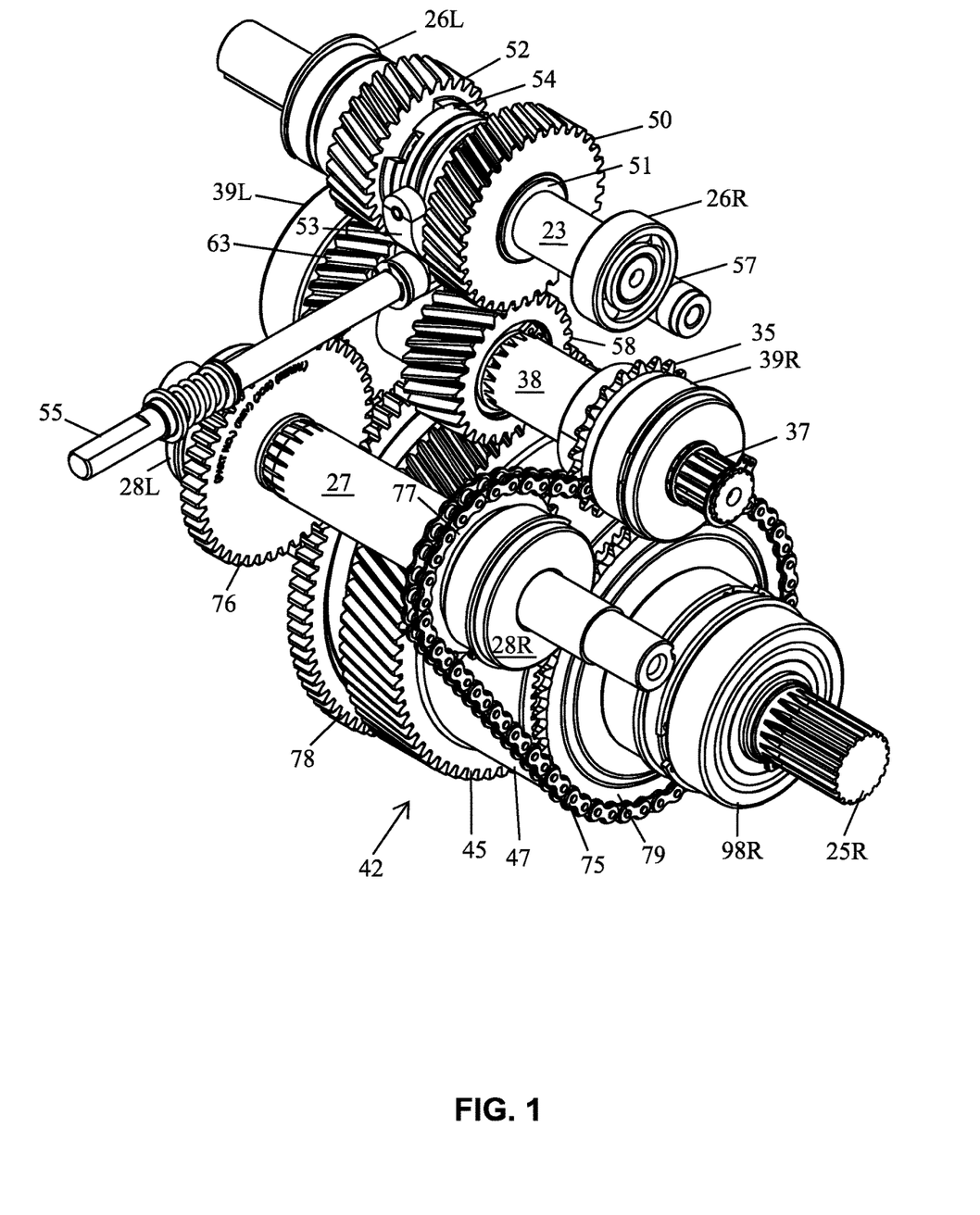
FIG. 1 shows a perspective view of an embodiment of a transmission.
Figure 2:
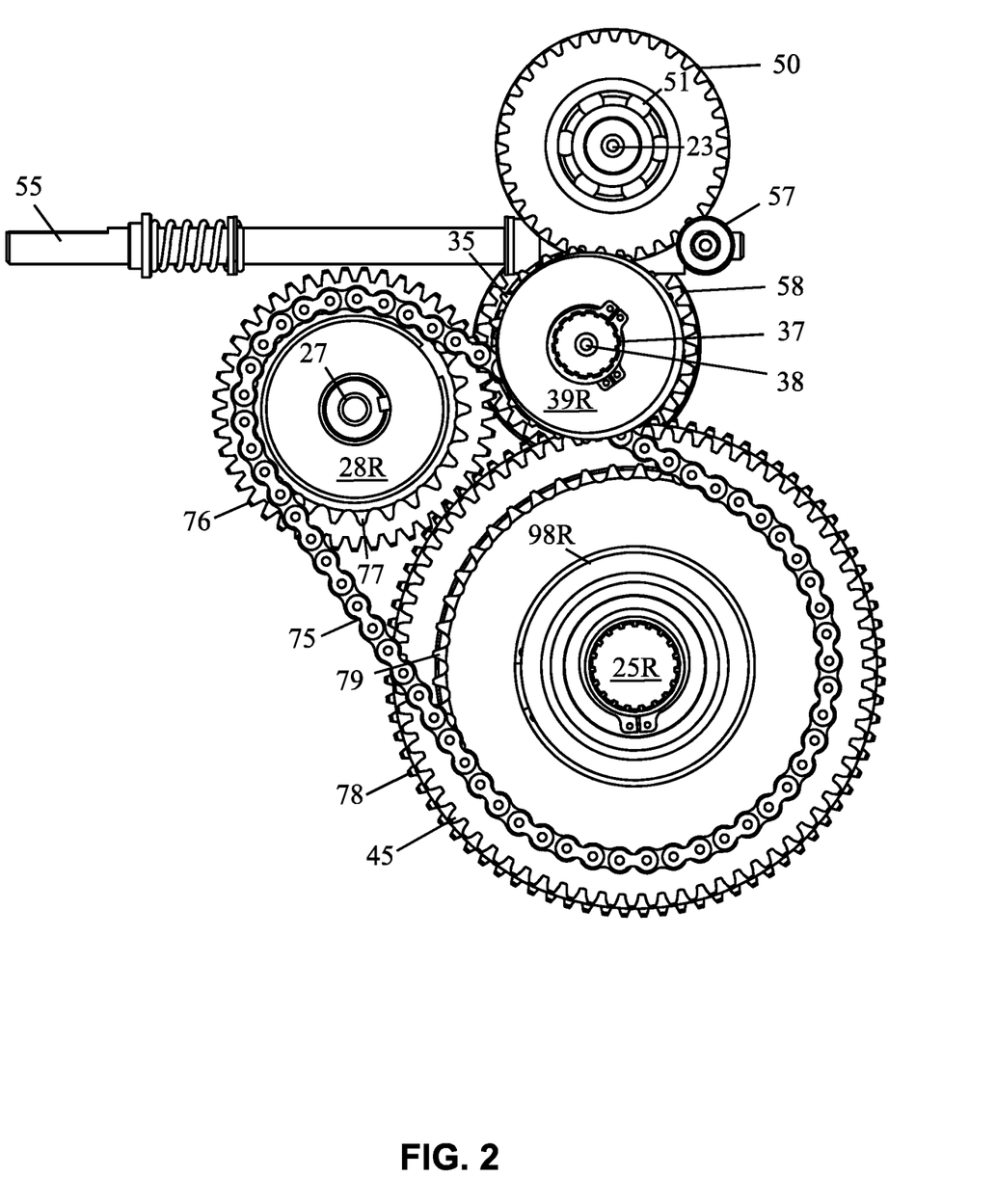
FIG. 2 shows a side view of the embodiment of the transmission of FIG. 1.
Figure 3:
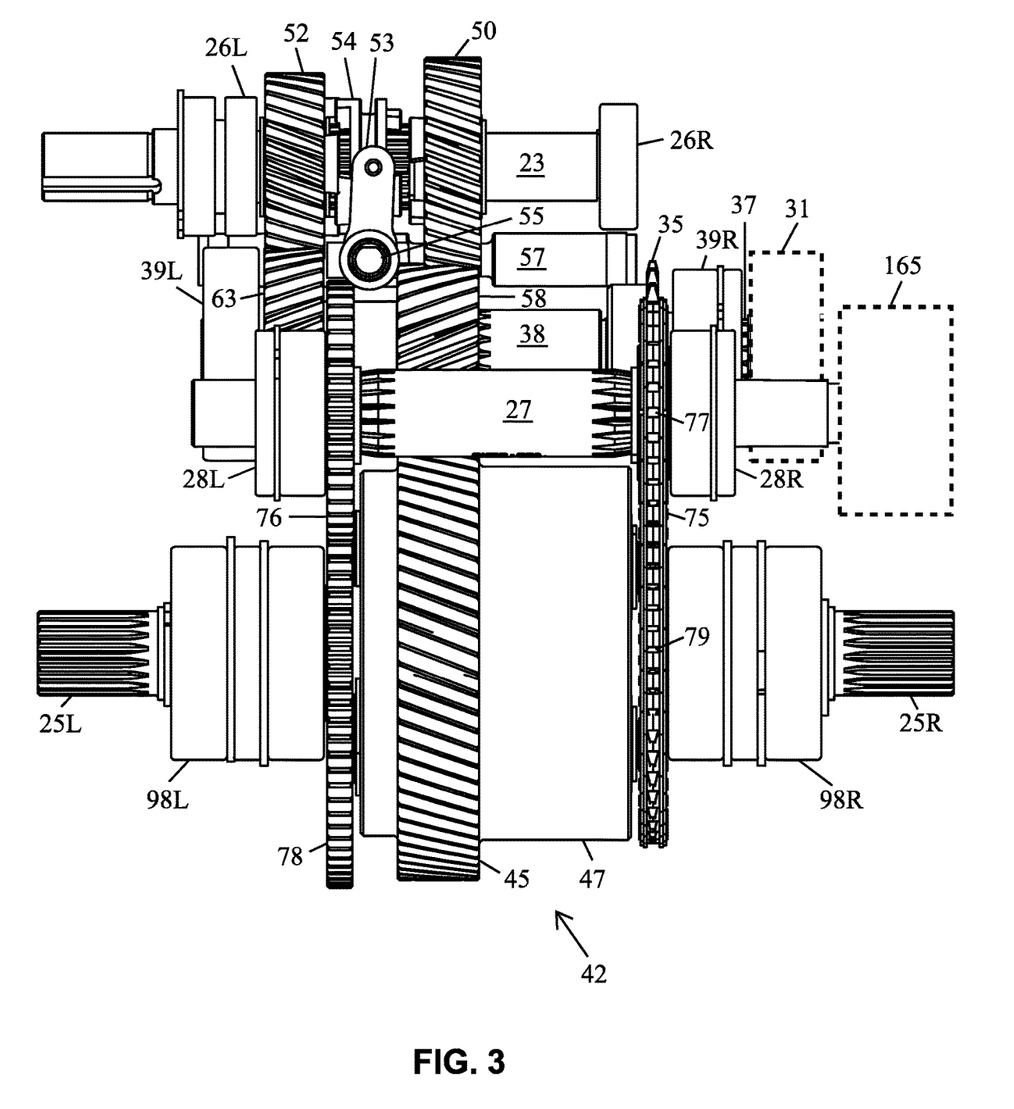
FIG. 3 shows an end view of an embodiment of a transmission and steering system, schematically illustrating a parking brake and steering motor.
Figure 4:
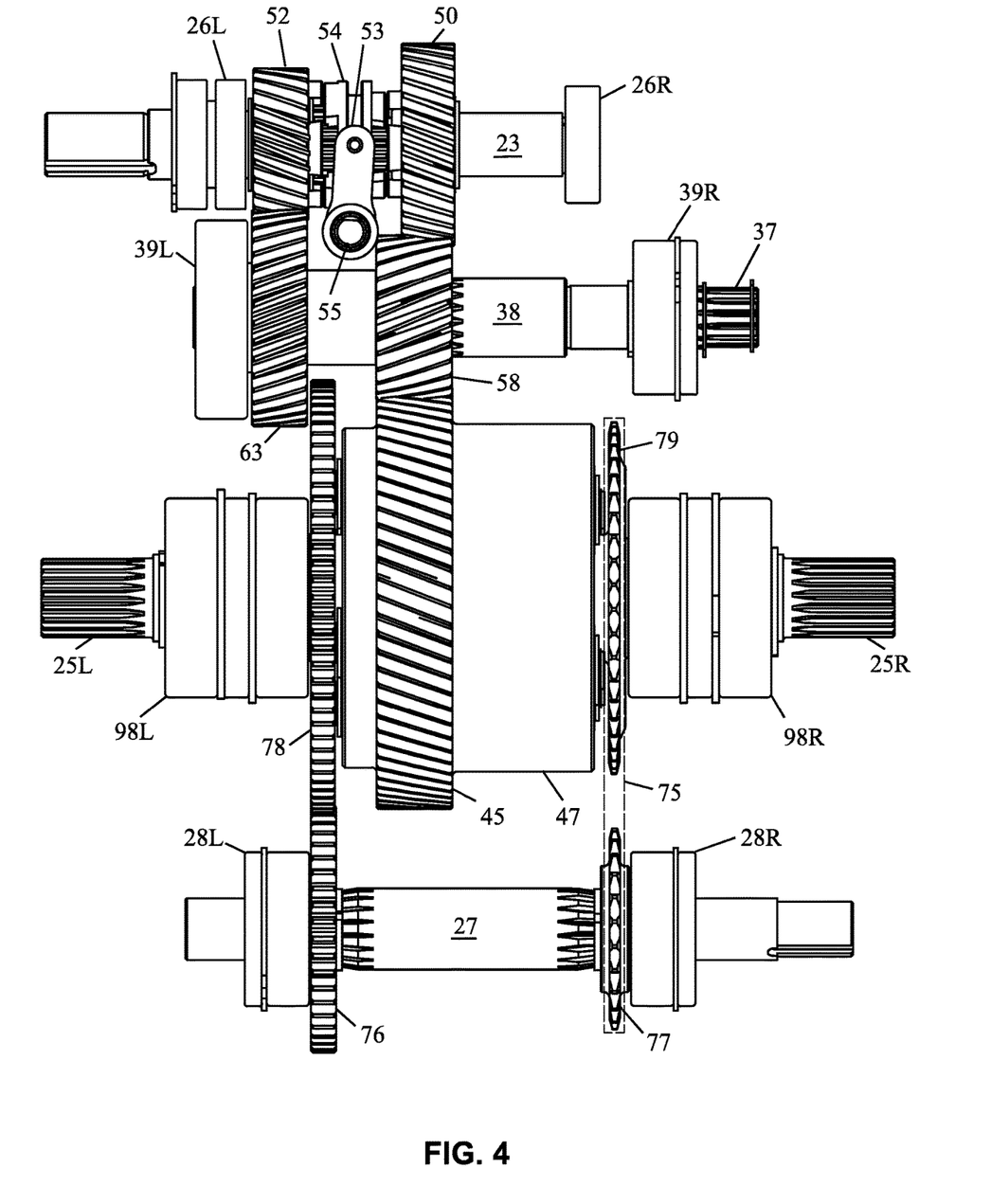
FIG. 4 shows a first schematic diagram of the embodiment of the transmission of FIG. 1 with a hi/lo selector in the NEUTRAL position.

An inter-shaft 38 is driven in a direction opposite to the rotation of the input shaft 23 at either a LOW or HIGH speed, depending on the position of the hi/lo selector-sleeve 54. The range of the left-right movement of the selector-sleeve 54 includes a neutral portion (as illustrated in FIGS. 3 and 4) that is sufficiently large to prevent LOW and HIGH from being engaged at the same time.

The engine-high-gear 50 drives an intermediate-high-gear (or inter-high-gear) 58, which is solid with the intermediate-shaft (or inter-shaft) 38. The engine-low-gear 52 drives an intermediate-low-gear (or inter-low-gear) 63, which also is solid with the inter-shaft 38. The inter-shaft 38 is rotationally supported within the housing 20 by inter-shaft-bearings 39L,39R.

The inter-high-gear 58 also doubles as a drive transmission gear, or inter-drive-gear, for conveying drive power to the drive-differentials 42. The inter-high-gear/inter-drive-gear 58 meshes with a wheel-drive-gear 45, which is solid with a wheel-ring 47 of the drive-differentials 42. Thus, the wheel-drive-gear 45 and wheel-ring 47 rotate in the same direction as the input shaft 23.

In a numerical example of the current embodiment, the engine-low-gear 52 has twenty-five teeth, and the inter-low-gear 63 has forty-one teeth. Thus, when the input shaft 23 is driven at e.g. +1000 revolutions per minute (rpm), in LOW speed mode the inter-shaft 38 rotates at an inter-shaft speed of 1000*25/41=−610 rpm. (The negative sign indicates rotation in the opposite sense to the rotation of the input shaft 23, which is described with a positive sign). The engine-high-gear 50 has twenty-seven teeth, and the inter-high-gear 58 has twenty-seven teeth; thus, in HIGH speed mode when the input shaft 23 has an input shaft speed of +1000 rpm, the inter-shaft speed is 1000*27/27=−1000 rpm.

Continuing with the numerical example, the wheel-drive-gear 45 has seventy-three teeth and the inter-high-gear 58 (which also functions as an inter-drive-gear 58) has twenty-seven teeth. Thus, when the input shaft speed is +1000 rpm and the inter-shaft speed is −610 rpm in LOW speed mode, the speed of the wheel-ring 47 is 610*27/73=+226 rpm. Similarly, when the input shaft speed is +1000 rpm and the inter-shaft speed is −1000 rpm in HIGH speed mode, the speed of the wheel-ring 47 is 1000*27/73=+370 rpm.

Persons of skill in the art will appreciate that no reverse gear is provided in the presently described embodiment that would permit the vehicle 100 to travel in a reverse direction. This function can be provided separately from the presently described transmission embodiment through the variable speed drive 114. Alternatively, when the prime mover 130 is an electric motor, an opposite rotational direction of the input shaft 23 can be readily provided by reversing the direction of the motor, resulting in a reverse direction of movement of the vehicle 100.

The inter-shaft 38 includes an inter-shaft extension 37 that extends beyond the inter-shaft-bearing 39R, outwardly of the housing 20. The inter-shaft extension 37 can be fitted with a parking brake in the form of a mechanical brake or high drive ratio electric brake motor that can be selectively electrically shorted to provide a high resistance to back-driving. Since the inter-shaft 38 is solid with inter-drive-gear 58, which is meshed with wheel-drive-gear 45, preventing rotation of the inter-shaft 38 in this manner effectively prevents rotation of the wheel-ring 47. In the embodiment shown in FIGS. 1-2 and 4-6, no parking brake structure is provided; however, in FIG. 3, a parking brake 31 is schematically illustrated by way of dashed lines. An inter-shaft-sprocket 35 is provided on the inter-shaft 38 and is rotationally free relative thereto to function as an idler for the steer-chain 75. When the parking brake 31 is applied to prevent rotation of the inter-shaft 38, the steer-chain 75 is free to move, which allows rotations of the steer-shaft 27 and on-the-spot equal rotational movement in opposite directions of the drive-shafts 25L,25R. The parking brake 31 thus effectively locks the drive differential 42 against forward or rearward movement of the vehicle 100, but permits rotation of the drive-shafts 25L,25R under influence of the steering motor 165.

The operation of the electric steering motor 165 and its function in the steering system will now be described. The steering motor 165 (illustrated schematically by dashed lines in FIG. 3 but omitted from FIGS. 1-2 and 4-6 for clarity) is connected to the steer-shaft 27 rotationally supported within the housing 20 (omitted from FIGS. 1-6 for clarity, as previously noted) by steer-shaft-bearings 28L,28R. The steering motor 165 can readily rotate the steer-shaft 27 in either a forward or reverse direction. The steer-shaft 27 solidly carries a steer-gear 76 and a steer-sprocket 77. The steer-gear 76 is in mesh with a drive-steer-gear 78 and the steer-sprocket 77 is connected to a drive-steer-sprocket 79 by an endless steer-chain 75, causing them to rotate in the same direction as the steer-shaft 27. The meshed steer-gear 76 and drive-steer-gear 78 rotate in opposite directions. Thus, regardless of the direction of rotation of the steer-shaft 27, the drive-steer-gear 78 and drive-steer-sprocket 79 rotate in opposite directions to one another. The ratio of the number of teeth on the steer-gear 76 and drive-steer-gear 78 is substantially equivalent to the ratio of the diameters of the steer-sprocket 77 and drive-steer-sprocket 79 so that rotation of the steer-shaft 27 causes equal and opposite rotation of the drive-steer-gear 78 and drive-steer-sprocket 79. The relationship between the afore-mentioned components is illustrated schematically in FIGS. 4-6, which show the components of the speed varying structure of the transmission in a planar relationship with one another. In order to make the transmission more compact, a planar relationship is not used in practice.

Continuing with the numerical example, in the currently described embodiment, the steer-gear 76 has forty-five teeth and the drive-steer-gear 78 has eighty-one teeth.

Persons of skill in the art will understand that the steer-sprocket 77, drive-steer-sprocket 79 and endless steer-chain 75 could be replaced by gears that are both enmeshed with an idler to ensure that they both continue to rotate in the same direction. In this case, the ratio of the number of teeth on the gears and idler are selected so as to achieve equal rotation to the combination of the steer-gear 76 and drive-steer-gear 78, as previously described.

Continuing with the numerical example of the current embodiment, the steer-gear 76 has forty-five teeth and the drive-steer-gear 78 has eighty-one teeth. Therefore, the drive-steer-gear 78 rotates at 45/81 of the speed of the steer-shaft 27 in the opposite direction. Thus, in straight-ahead motion with the steer-shaft 27 rotating at +1000 rpm, the drive-steer-gear 78 rotates at 1000*45/81=−556 rpm. The drive-steer-sprocket 79 rotates at +556 rpm. It is desirable that the steer ratio, defined as the number of rotations of the steer-shaft 27 to the drive-steer-gear 78 and drive-steer-sprocket 79, is in the range of from 1.5:1 to 2.5:1, preferably substantially 2:1. In the numerical example given above, the steer ratio is 1000/556=1.8.

The operation of the drive-differential 42 will now be described with reference to FIG. 7. The drive differential 42 comprises left and right drive-differential portions sharing a common drive-differential-housing, being the said wheel-ring 47. The wheel-ring 47 carries the wheel-drive-gear 45. The wheel-drive-gear 45 is, as mentioned, in mesh with the inter-drive-gear 58 that is solid with the inter-shaft 38. The wheel-drive-gear 45 remains in this same fixed ratio with respect to the inter-shaft 38 during forward motion, whether HIGH or LOW is selected, and whether or not the vehicle is being steered.

Drive-sun-gears 83L,83R of the drive-differentials are solid with, and rotate with, the drive-steer-gear 78 and drive-steer-sprocket 79, respectively. Left and right drive-spiders 85L,85R are solid with the left and right drive-shafts 25L,25R, which extend through the housing 20 and are rotationally supported by left and right drive-shaft-bearings 98L,98R for ultimate connection to the drive structures 105. Drive-sun-gears 83L,83R are supported by bearings and allowed to freely rotate relative to the left and right drive-shafts 25L,25R. Drive-ring-gears 80L,80R, are provided circumferentially about an inner surface of the wheel-ring 47 for both the left and right drive differential portions. A plurality of drive-planet-gears 84L,84R (four for each of the right and left drive-differential portions, although only two are shown for each drive-differential portion in FIG. 7) are rotationally mounted on corresponding drive-stub-shafts 86L,86R projecting outwardly from the drive-spiders 85L, 85R. The drive-planet-gears 84L,84R are enmeshed with both the drive-ring-gears 80L,80R and the drive-sun-gears 83L,83R.

A centre-pin 90 is screwed into the left drive-shaft 25L, and becomes rigidly unitary therewith. The centre-pin 90 runs in a centre-pin-bearing 92 with respect to the right drive-shaft 25R. The taper-roller drive-ring-bearings 96 thus are mounted on the centre-pin 90, rather than directly on the drive-shafts themselves, permitting the wheel-ring 47 to rotate about the centre-pin 90 under the influence of wheel-drive-gear 45.

Rotation of the wheel-ring 47 about the centre-pin 90 causes rotation of the drive-planet-gears 84L,84R about the drive-stub-shafts 86L,86R through action of the drive-sun-gears 83L,83R. The drive-stub-shafts 86L,86R in turn urge the drive-spiders 85L,85R to rotate and thus cause rotation of the left and right drive-shafts 25L,25R, albeit at a different rate than that of the wheel-ring 47 that is dependent upon the intervening gear ratio. The speed of the left and right drive-shafts 25L,25R when no steering input is provided can be considered a nominal rotation speed or base rotation speed of the drive-differential 42. Although the drive-sun-gears 83L,83R are also urged to rotate by virtue of being enmeshed with the drive-planet-gears 84L,84R, since the drive-steer-gear 78 and drive-steer-sprocket 79 are constrained to rotate at equal speeds and in opposite directions to one another through the steer-shaft 27, their tendency to move is cancelled out. Thus, the drive-sun-gears 83L,83R remain stationary in the absence of steering input from the steering motor 165.

However, in the presence of input power from the steering motor 165 causing the steer-shaft 27 to rotate in the same direction as the wheel-ring 47, the drive-steer-gear 78 is caused to rotate in the opposite direction, thereby increasing the rotational speed of the left drive-planet-gears 84L, causing them to orbit more quickly, thereby increasing the rotational speed of the left drive-spider 85L and also the left drive-shaft 25L. This causes the vehicle 100 to turn to the right. Simultaneously, the opposite effect is taking place on the right side due to the influence of the drive-steer-sprocket 79, which is rotating in the same direction as the wheel-ring 47. This causes the right drive-planet-gears 84R to orbit more slowly, thereby decreasing the rotational speed of the right drive-spider 85R and the right drive-shaft 25R. In fact, if the input from the steer-shaft 27 causes the drive-steer-sprocket 79 to rotate fast enough, the orbit of the right drive-planet-gears could even reverse direction and cause the drive-shaft 25R to spin in the opposite direction to the drive-shaft 25L. This further enhances the turning of the vehicle 100 to the right. Of course, rotating the steer-shaft 27 in the opposite direction to the wheel-ring 47 would cause the vehicle 100 to turn to the left.

The equation or formula that relates the speeds of the various components of an epicyclic gearset can be expressed as follows. An epicyclic gearset includes a sun-gear, and planet-gears that mesh with the sun-gear. The gearset also includes a ring-gear having inwards-facing teeth, which mesh with the planet-gears. The planet-gears are mounted on respective legs of a rotating spider. The sun-gear, the spider, and the ring-gear, are mounted for relative rotation about a common axis. The formula is:

$$R_{spider} = R_{ring} * T_{ring}/(T_{ring}+T_{sun}) - R_{sun} * T_{sun}/(T_{ring}+T_{sun}),$$

where the prefix R refers to a rotary speed (e.g. in rpm) of the stated component and the prefix T refers to the number of teeth on the stated gear.

In the numerical example of the current embodiment, in respect of the left and right drive-differential portions, $T_{ring}$ is the number of teeth in the drive-ring-gears 80L,80R, being seventy-nine teeth, and $T_{sun}$ is the number of teeth in the drive-sun-gears 83L,83R, being thirty-five teeth. Thus, for this transmission, the above formula becomes:

$$R_{drive\text{-}spider} = R_{wheel\text{-}ring} * 79/(79+35) - R_{drive\text{-}sun} * 35/(79+35),$$

i.e.

$$R_{drive\text{-}spider} = R_{wheel\text{-}ring} * 0.693 - R_{drive\text{-}sun} * 0.307.$$

Again, the speeds of the various shafts are computed on the basis that the input shaft 23 is rotating at +1000 rpm. To recap, with no steering, the drive-steer-gear 78 and drive-steer-sprocket 79 rotate at 0 rpm, due to the requirement for opposite rotation through the steer-shaft 27. Drive-sun-gears 83L,83R of the drive-differentials are solid with, and rotate with, the drive-steer-gear 78 and drive-steer-sprocket 79, respectively. Thus, unsteered, the two drive-sun-gears 83L, 83R both rotate at 0 rpm. These figures can be entered in the above formula as the $R_{sun}$ term.

The $R_{ring}$ term in the formula is the speed of the wheel-ring 47, which is common to the two drive-differential portions, the speed being +226 rpm in LOW mode and +370 rpm in HIGH mode.

Left and right drive-spiders 85L,85R are solid with the left and right drive-shafts 25L,25R. Now, the speeds of the left and right drive-spiders 85L,85R can be determined, upon entering the $R_{ring}$ and $R_{sun}$ figures in the above formula. Thus, for the numerical example of the current embodiment in straight ahead motion, the formula ($R_{spider} = R_{ring} * 0.693 - R_{sun} * 0.307$) in respect of both drive-differentials, computes as:

1) in unsteered HIGH mode, $R_{drive\text{-}spider\text{-}unsteered\text{-}high} = 370 * 0.693 - 0 * 0.307 = 256 - 0 = +256$ rpm; and, 2) in unsteered LOW mode, $R_{drive\text{-}spider\text{-}unsteered\text{-}low} = 226 * 0.693 - 0 * 0.307 = 156 - 0 = +156$ rpm.

Again, the drive-spiders 85L,85R are solid with the drive-shafts 25L,25R, so these computed speeds of the drive-spiders are also the speeds of the drive-shafts.

The corresponding computations in respect of steering the vehicle will now be addressed. Assuming an input of +1000 rpm to the steer-shaft 27 and using the previously determined steer ratio of 1.8:1, the drive-steer-gear 78 rotates at 1000/1.8=556 rpm, but in the opposite direction to the steer-shaft 27, making it −556 rpm. Similarly, the drive-steer-sprocket 79 rotates at +556 rpm.

Thus, in the left portion of the drive-differential 42, the left drive-sun-gear 83L rotates at −556 rpm (HIGH or LOW); i.e. $R_{leftsun\text{-}steered} = -556$. In the right portion of the drive-differential 42, the right drive-sun-gear 83R rotates at +556 rpm (HIGH or LOW); i.e. $R_{rightsun\text{-}steered} = +556$.

So now, with the input shaft 23 rotating at +1000 rpm, the above formula ($R_{drive\text{-}spider} = R_{wheel\text{-}ring} * 0.693 - R_{wheel\text{-}sun} * 0.307$) computes as:

1) in steered HIGH mode, right side $R_{rightdrive\text{-}spider\text{-}steered\text{-}high} = 370 * 0.693 - (+556 * 0.307) = 256 - (+171) = +85$ rpm and left side $R_{leftdrive\text{-}spider\text{-}steered\text{-}high} = 370 * 0.693 - (-556 * 0.307) = 256 - (-171) = +427$ rpm; and, 2) in steered LOW mode, right side $R_{rightdrive\text{-}spider\text{-}steered\text{-}low} = 226 * 0.693 - (+556 * 0.307) = 156 - (+171) = -15$ rpm and left side $R_{leftdrive\text{-}spider\text{-}steered\text{-}low} = 226 * 0.693 - (-556 * 0.307) = 156 - (-171) = +327$ rpm.

Since the drive-spiders 85L,85R are solid with the drive-shafts 25L,25R, these computed speeds of the drive-spiders are also the speeds of the drive-shafts. Hence, for a steer-shaft input of +1000 rpm, the speed of the right drive-shaft 25R is less than that of the left drive-shaft 25L and the vehicle 100 turns to the right. Rotation of the steer-shaft 27 in the opposite direction would cause the vehicle 100 to turn to the left.

The steering radius is, in LOW mode, considerably tighter than it is in HIGH mode. As can be seen from the above numerical example, at a steer-shaft input speed of +1000 rpm, in LOW mode the drive-shaft 25R actually turns in the opposite direction to the drive-shaft 25L, causing the vehicle to execute a sharp right turn. In HIGH mode, although the difference between the speeds of the right drive-shaft 25R and the left drive-shaft 25L is the same (171 rpm), since the nominal or base speed of the drive-shafts 25L,25R is higher (256 rpm vs. 156 rpm), both shafts continue to turn in the same direction. Thus, the nominal or base speed of the drive-shafts 25L,25R is varied by a steer ratio (in the numerical example, 1.8:1) of the steer-shaft 27 upwardly and downwardly, depending on the direction of the input to the steer-shaft 27. The speed of the drive-shafts 25L,25R is increased or decreased from nominal by a number of rotations that is directly related to the rotational speed of the steer-shaft 27 by the steer ratio (in this case 1.8).

One of the benefits of the present transmission design is that the wasted energy usually associated with skid-steering can be reduced. In addition, a more gradual turn can be achieved as compared with conventional skid steering, wherein drive structure on one side is abruptly changed to affect the turn. By ramping up the speed of the steering motor 165 through the steering control structure 160, a progressively increasing rate of turn can be achieved, which is more natural for vehicle operators and provides greater flexibility in terms of vehicle operation. Also, rotating the slower of the two drive-shafts slowly backwards during a tight forward turn is effective to prevent, or at least to inhibit, the drive structure (wheels or track) on the slow side from tending to slip and slide. It is when the slow-side drive structure is actually stationary that the treads or cleats tend to become clogged with clinging slippery ground material, and then start to slip.

The steer-motor 165 provides additional power to the steering system, over and above that provided by the prime move 130. In conventional skid-steered vehicles, brakes are utilized to slow drive structure on one side or the other of the vehicle. This reduces the overall power available to the vehicle through friction and results in the vehicle slowing through the turn, sometimes causing the operator to counter-intuitively increase the power of the prime mover 130 (e.g. by opening a throttle) during the turn. In contrast, using the steer-motor 165 does not remove overall power from the system through frictional losses and instead increases the total available power during steering. This manner of arranging the steering system of the vehicle contributes to making it possible for the present system to be of simple, robust construction and to be suitable for energy-efficient use in a comparatively low-powered vehicle. It has been found that a vehicle equipped with the steering/transmission system as described herein can be expected to use greater than thirty percent (e.g. 35 or 40%) less energy on average than a corresponding vehicle that is otherwise similarly equipped, but employs simple skid-steering.

The wheel-ring 47 floats on the rotating left and right drive-shafts 25L,25R, without requiring a large external bearing for support. The wheel-ring 47 is supported by drive-ring-bearings 96 upon and between the two rotating wheels-shafts 25L,25R, which are themselves supported on respective drive-shaft-bearings 98L,98R carried by the housing 20. The elements of the drive-shaft-bearings 98 are, as can be seen, well-spaced and very robustly supported in the housing 20, so much so that floating the wheel-ring 47 from and between the drive-shafts 25 can be utilized.

Of course, the left drive-shaft 25L rotates at a different speed from the right drive-shaft 25R during steering, and the components must be structured to accommodate that fact, while providing the required support. The centre-pin 90 is screwed into the left drive-shaft, and becomes rigidly unitary therewith. The centre-pin 90 runs in the centre-pin-bearing 92 with respect to the right drive-shaft 25R. The taper-roller drive-ring-bearings 96 thus are mounted on the centre-pin 90, rather than directly on the drive-shafts themselves.

By resorting to what might be called the floating-shafts-within-shafts support system, as described, for the wheel-ring 47, the transmission and steer system as a whole is much simplified as a structural unit. If the wheel-ring 47 had to be supported on bearings which were themselves carried directly by the housing 20, the structure as a whole would have to be considerably widened, and made heavier, and would become significantly more complex. In a transmission, small increases in size, weight and increased complexity can be regarded as large multipliers of cost and fuel consumption.

Herein, two shafts or other rotating entities are described as being "in a fixed-ratio relationship" if the gear ratio between them solely dictates the ratio of their relative rotational speed. Thus, two shafts are not in a fixed-ratio relationship: (a) where the two shafts are relatively-rotatable components of an epicyclic train; or, (b) where the two shafts are relatively-rotatable components of a differential.

The expression is generally applicable when the constancy of the ratio remains unaffected by whether or not the vehicle is being steered. Where the speed ratio between two shafts changes during steering maneuvers of the vehicle, those two shafts are not in a fixed-ratio relationship. However, the fact that the gear ratio of two shafts is capable of being changed (e.g. manually) from one fixed ratio to another, as an isolated event, does not prevent the gearing relationship between the two shafts from being described as a fixed-ratio relationship.

For example, the steer-shaft 27 is not in a fixed-ratio relationship with the inter-shaft 38 or the input shaft 23; however, the inter-shaft 38 and the input shaft 23 are in a fixed ratio relationship when either HIGH or LOW mode is selected (but not in neutral). The left drive-sun-gear 83L is in a fixed-ratio relationship with the left drive-shaft 25L and the right drive-sun-gear 83R is in a fixed-ratio relationship with the right drive-shaft 25R. The wheel-ring 47 is in a fixed-ratio relationship with the inter-shaft 38 and with the input shaft 23 when either HIGH or LOW mode is selected (but not in neutral). The two drive-shafts (i.e. the left drive-shaft 25L and the right drive-shaft 25R) are not in a fixed ratio relationship when steering, but otherwise can be considered to be in a fixed ratio relationship.

The expression "fixed ratio" means that the ratio does not change during steering. However, it should be noted that, in the case of some of the pairs of rotating entities in the gearbox of the drawings, the fixed ratio does change upon shifting between HIGH mode and LOW mode. Thus, in the embodiment shown, the fixed-ratio in HIGH mode between the input shaft 23 and the wheel-ring 47 is different from the fixed-ratio between those two components in LOW mode, but their ratio, whether that ratio is derived from HIGH mode or LOW mode, does remain constant so long as the mode remains unchanged.

A "bearing", as that term is used herein, is a device in which an anti-friction means (e.g. balls/rollers/needles, or low-friction material) is in direct contact with two races, being an inner race and an outer race. The races are, or are attached rigidly to, respective elements or components of the apparatus, being elements that are capable of rotary movement relative to each other. (One of the elements might be stationary.) Often, the races are attached to their respective elements by being an interference fit therein; but whatever the manner of attachment, the race is said to be integrated into the element insofar as the race functions as if it were formed directly into the element.

Some of the components and features in the drawings have been given numerals with letter suffixes, which indicate left or right versions of the components. The numeral without the suffix is used herein to indicate the component generically.

Terms of orientation (e.g. "left", "right", etc.) when used herein are intended to be construed as follows. The terms being applied to an apparatus, that apparatus is distinguished by the terms of orientation only if there is not one single orientation into which the apparatus, or an image or mirror image thereof, can be placed, in which the terms can be applied consistently.

The accompanying drawings are diagrammatic. In respect of some of the components that are shown monolithically, for ease of explanation of complex operation, of course the designer would see to it that the components are divided up into two or more elements, for ease of manufacturing or assembly purposes.

Herein, the term "unitary" is used to refer to two components which, during operation, perform as if they had been manufactured monolithically, although the components may be separable or dismantable, e.g. for manufacturing or assembly or servicing reasons.

The novel features will become apparent to those of skill in the art upon examination of the description. Inventive combinations of any one disclosed feature with another disclosed feature are intended to be claimed by the inventors. It should be understood, however, that the scope of the claims should not be limited by the embodiments, but should be given the broadest interpretation consistent with the wording of the claims and the specification as a whole.

The invention claimed is:

1. A skid-steered vehicle comprising:
a prime mover;
a continuously variable transmission (CVT) coupled to prime mover; and
a transmission, the transmission having:
an input shaft rotatably coupled to the CVT, the input shaft having an input-high-gear and an input-low-gear rotatably selectably coupled thereto; an inter-shaft having rotatably coupled thereto an intermediate-high-gear and an intermediate-low-gear, wherein the intermediate-high-gear is intermeshed with the input-high-gear and the intermediate-low-gear is intermeshed with the input-low-gear.
a wheel-ring having a wheel-drive-gear that is solid with the wheel-ring, the wheel-drive-gear being intermeshed with the intermediate-high gear, a steer shaft in parallel with the input shaft, the steer shaft rotatably driven by a steering motor, wherein the steer shaft carries a steer-gear and a steer-sprocket, the steer-gear and the steer-sprocket being rotatably coupled to the steer shaft, wherein the steer-gear is intermeshed with a drive-steer-gear, and wherein the steer-sprocket is connected to a drive-steer-sprocket via a steer-chain; and left and right drive shafts are epicyclically connected to both the wheel-ring and the steer shaft, wherein a drive-sun-gear is solid with and rotates with the drive-steer-gear.

2. The vehicle of claim 1, wherein the steer shaft is coupled to an electric motor.

3. The vehicle of claim 1, wherein the prime mover is an electric motor.

4. The vehicle of claim 1, wherein the prime mover is a combustion engine.

5. The vehicle of claim 1, wherein the transmission has a steer ratio, the steer ratio is between 1.5:1 and 2.5:1.

6. The vehicle of claim 1, wherein the vehicle is remotely controlled.

7. The vehicle of claim 1, wherein the vehicle is autonomous.

8. The vehicle of claim 1, wherein the transmission further comprises a shift-fork and a selector-sleeve, the shift-fork engaged to the selector-sleeve, wherein the selector-sleeve is rotatably coupled to the input shaft.

9. The vehicle of claim 8, wherein the transmission further comprises a shift-rod, the shift-fork fixed to the shift-rod.

10. A remotely controlled vehicle comprising:
a prime mover;
a continuously variable transmission (CVT) coupled to prime mover; and
a transmission, the transmission having:
an input shaft rotatably coupled to the CVT, the input shaft having an input-high-gear and an input-low-gear rotatably selectably coupled thereto; an inter-shaft having rotatably coupled thereto an intermediate-high-gear and an intermediate-low-gear, wherein the intermediate-high-gear is intermeshed with the input-high-gear and the intermediate-low-gear is intermeshed with the input-low-gear.
a wheel-ring having a wheel-drive-gear that is solid with the wheel-ring, the wheel-drive-gear being intermeshed with the intermediate-high gear, a steer shaft in parallel with the input shaft, the steer shaft rotatably driven by a steering motor, wherein the steer shaft carries a steer-gear, the steer-gear being rotatably coupled to the steer shaft, wherein the steer-gear is intermeshed with a drive-steer-gear; and left and right drive shafts are epicyclically connected to both the wheel-ring and the steer shaft, wherein a drive-sun-gear is solid with and rotates with the drive-steer-gear.

11. The vehicle of claim 10, wherein the steer shaft is coupled to an electric motor.

12. The vehicle of claim 10, wherein the prime mover is an electric motor.

13. The vehicle of claim 10, wherein the prime mover is a combustion engine.

14. The vehicle of claim 10, wherein the transmission has a steer ratio, the steer ratio is between 1.5:1 and 2.5:1.

15. The vehicle of claim 10, wherein the vehicle is remotely controlled.

16. The vehicle of claim 10, wherein the vehicle is autonomous.

17. The vehicle of claim 10, wherein the transmission further comprises a shift-fork and a selector-sleeve, the shift-fork engaged to the selector-sleeve, wherein the selector-sleeve is rotatably coupled to the input shaft.

18. The vehicle of claim 17, wherein the transmission further comprises a shift-rod, the shift-fork fixed to the shift-rod.

* * * * *